Patented Dec. 30, 1924.

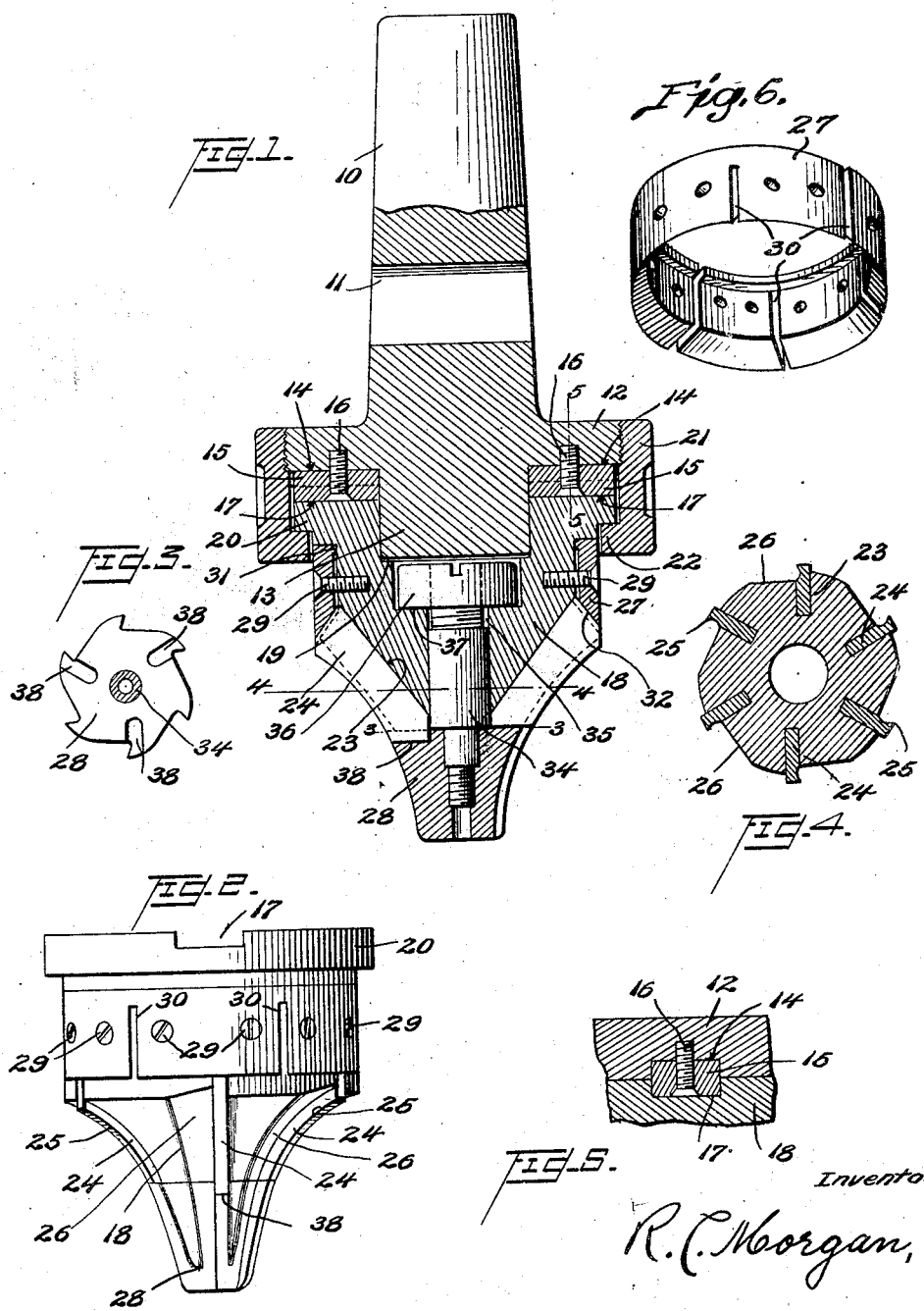

1,521,467

UNITED STATES PATENT OFFICE.

REES C. MORGAN, OF BETHLEHEM, PENNSYLVANIA, ASSIGNOR TO BETHLEHEM STEEL COMPANY, OF BETHLEHEM, PENNSYLVANIA, A CORPORATION OF PENNSYLVANIA.

MILLING CUTTER.

Application filed November 9, 1920. Serial No. 422,835.

*To all whom it may concern:*

Be it known that I, REES C. MORGAN, a citizen of the United States, and residing at Bethlehem, Northampton County, State of Pennsylvania, have invented certain new and useful Improvements in Milling Cutters, of which the following is a specification.

The present invention relates to milling tools of the type having cutting blades formed separately from the body of the tool and detachably secured thereto, so as to be readily removable for replacement or resharpening.

The objects of the invention are; to provide a tool of this class which is simple in design, strong and convenient and adaptable in use as well as being relatively inexpensive to manufacture and adapted to save time in operation.

The tool comprises two principal parts, a shank which may be secured in a milling machine and a cutting head which is detachably secured to the shank. Side cutting blades and a cutting nose are also detachably secured to the head and may be individually replaced when dulled or broken. The main portion of the head is fabricated of ordinary machine steel while the cutting blades alone are of the expensive high grade tool steel necessary for the cutting operation. The shapes of the side cutting blades and the manner of securing the same to the head are features of the invention, the shapes of the side cutting blades being such that they may be heat treated with a minimum of danger of breaking and the manner of securing the same to the head being such that they are firmly supported in cutting, thereby enabling the individual blades to be of minimum size.

The cutting nose has a plurality of cutting edges aligned with the cutting edges of the side blades, this nose being also detachably secured to the head so that it may be removed and replaced when desired.

The invention will be fully disclosed in the following description and in the accompanying drawings and additional features and objects will become apparent therefrom, to those skilled in the art.

Figure 1 is a longitudinal section through the tool, the head being shown attached to the shank;

Figure 2 is a side elevation of the removable head;

Figure 3 is a section on line 3—3 of Figure 1;

Figure 4 is a section on line 4—4 of Figure 1;

Figure 5 is a section on line 5—5 of Figure 1.

Fig. 6 is a perspective view of the securing ring.

The shank of the milling tool is indicated at 10 in the drawings, this shank being preferably tapered and provided with an aperture or keyway 11 to receive a pin or key for the purpose of securing it to a milling machine. The forward end of the shank is provided with an annular flange 12, the cylindrical outer surface of which is threaded and is centered about the axis of the shank. Extending forwardly of said flange 12 is a cylindrical part 13, integral with the shank and also centered about its axis. The forward face of the annular flange 12 is provided with radial grooves or recesses 14 in which are secured the key members 15 by means of screws 16, the key members projecting from said recesses, as shown in Figure 5, and extending into grooves or recesses 17 in the rear of the head 18.

This head 18 is formed entirely separately from the shank 10 and has in its rear face, in addition to the grooves 17, a central cylindrical recess 19 to receive the projection 13 of the shank. This recess 19 is concentric with a circle drawn through the cutting edges of the head so that when the head is in position on the shank all of said cutting edges are equidistant from the axis of the shank. The head 18 is fabricated of any suitable material, such as machine steel, and is substantially cone-shaped. It has an annular flange 20 at its rear end and a clamping collar 21 having threaded engagement with the annular portion 12 of the shank has an inwardly turned flange portion 22 which is adapted to bear against the front face of the annular flange 20, whereby the head may be securely clamped to the shank. The forward end of the head is cone shaped, as shown, and has therein a plurality of radial recesses 23, each of which is adapted to receive a cutting blade 24 of tool steel, or steel especially adapted for the cutting purposes for which the tool may be intended.

The various cutting edges of these blades are indicated at 25 and the head is cut away at 26 in advance of each cutting edge to provide a space for the chips severed from the work. These cutting blades are held in position by the two-part securing ring 27 at their upper ends and by the cutting nose 28 at their lower ends. The ring 27 is formed in two similar portions, each of which is secured to the head by a plurality of screws 29, and each of which is partially cut through, as at 30, midway between the pairs of cutting blades. The raised upper inner edges or ribs 31 of the halves of ring 27 bear against the head, and their lower inclined faces 32 bear on the upper ends of the side cutting blades 24. The lower ends of the side cutting blades rest upon the circular upper surface of the cutting nose 28 and these radial blades are thus clamped in position between the nose 28 and the ring 27.

The blades are caused to lie flat in their respective slots by tightening the screws 29, which causes the lower ends of the segments of the ring to move inwardly, pressing the blades inwardly and downwardly, and holding them in such position. The nose 28 has a bolt 34 secured thereto which extends rearwardly through an axial aperture 35 in the head, this bolt having a nut 36 on its threaded rear end portion which bears upon the annular shoulder 37 of the head and thereby holds the nose 28 securely in position.

The alternate side cutting blades extend downwardly into recesses 38 formed in the upper end of the nose 28 and the nose is thereby positively prevented from rotating relatively to the head. The side cutters which thus extend into recesses in the nose also cut off any bead from the work which might be left thereon as a result of a slight gap between the lower end of any other side cutter and the upper ends of the cutting blades of the nose.

By clamping the side cutting blades into their receiving slots in the manner described it is possible to make them without openings for bolts or securing screws, and they may be freely heat-treated without danger of becoming weakened thereby. The central nose portion of the tool of course performs harder work than the side cutting blades and its formation as a separate piece is especially advantageous inasmuch as the lower ends of its cutting edges, which naturally perform the hardest work of any cutting edges on the tool and are ordinarily the weakest because of their advanced position and the difficulty of supporting them, may be said to support each other because of their integral formation and the maximum strength possible to obtain in such a construction is thereby realized.

In using the tool the shank is of course secured in the spindle of the machine and may be left in such position until the work is completed. If it is desired to replace a cutting blade or to substitute finishing cutters for roughing cutters, or vice versa, the entire head may be removed by loosening the clamping collar. The various blades may be then detached from the head by either loosening and removing the two-part securing ring 27 or by removing the nose 28. After replacement of the blades the head may be quickly secured to the shank, it being accurately centered because of the interengaging of the projection 13 of the shank in the recess 19 of the head, the head being of course turned until its radial grooves 17 are in position to receive the keys 15. These keys prevent relative rotation between the shank and head.

The shank and head may be, as before explained, made of low or medium carbon steel and because of the solid support offered to the cutting blades 24 by the head these blades may be made quite small thereby effecting a considerable saving in the amount of high grade steel required. The design and arrangement of the parts of the invention may of course be considerably varied, it being obvious that milling tools having widely different configurations are within the scope of the invention which is not limited to the exact form illustrated and described.

Having thus described my invention what I claim as new and desire to secure by Letters Patent is:

1. In a milling tool, in combination, a shank member having a transverse flange, a head member, one of said members having a recess to receive a projecting portion of the other member for centering purposes and said head member abutting at one end against said flange, and key means arranged between the head and said flange for preventing relative rotary movement between the head and shank members.

2. In a milling tool, in combination, a shank having a threaded portion, a head having a plurality of cutting edges and an annular flange in rear of the cutting edges, and a clamping collar comprising an annular ring having threaded engagement with the shank and having a flange engaging the annular flange of the head.

3. In a milling tool, in combination, a shank having an annular flange the outer cylindrical surface of which is threaded and having a cylindrical projection extending axially in advance of the flange, a head having cutting edges and an axial recess in its rear face to receive the projecting portion of the shank, and having an annular flange substantially parallel to the annular flange of the shank, and a collar for clamping the head to the shank said collar comprising an annular member having a threaded portion to engage the threaded portion of the shank, and an inwardly extending annular flange to engage the flange on the head.

4. In a milling tool, in combination, a head portion tapering toward its forward end, a plurality of cutting blades secured to the inclined wall of the head, and a cutting nose detachably secured to the forward end of the head.

5. In a milling tool, in combination, a head portion having a plurality of substantially radial recesses formed therein, a cutting blade secured in each of said recesses, and a cutting nose detachably secured in advance of the cutting blades.

6. In a milling tool, in combination, a head portion having a plurality of substantially radial recesses formed therein, a cutting blade secured in each of said recesses, and a cutting nose detachably secured in advance of the cutting blades and bearing against the lower ends of said blades to assist in retaining them in position.

7. In a milling tool, in combination, a head, a plurality of cutting blades, and means for detachably securing the blades to the head including a member engaging the blades at one end thereof and adjustable axially of the head and a second member engaging the blades at the other end thereof and movable radially of the head.

8. In a milling tool, in combination, a head, a plurality of cutting blades arranged around the head and inclined to the axis thereof, and means for securing the blades to the head including a member adjustably secured to the head for axial movement and engaging the forward ends of the blades, and a second member engaging the rear ends of the blades and adjustable radially of the head.

9. In a milling tool, in combination, a head a plurality of cutting blades arranged around the head and inclined to the axis thereof, and means for positively clamping the blades to the head including a member adjustably secured to the head for axial movement and engaging the forward ends of the blades, and an adjustable ring engaging the rear ends of the blades.

10. In a milling tool, in combination, a head, a plurality of cutting blades arranged around the head and inclined to the axis thereof, and means for positively clamping the blades to the head including a member adjustably secured to the head for axial movement and engaging the forward ends of the blades, and a radially adjustable ring engaging the rear ends of the blades.

11. In a milling tool, in combination a tapered head having a plurality of inclined radial slots therein, cutting blades in said slots and adjustable means at the ends of the slots for clamping the blades in operative position.

12. In a milling tool, in combination, a tapered head having a plurality of inclined radial slots open at the ends, cutting blades in said slots and projecting from the ends thereof and means engaging the projecting ends of the blades to clamp them to the head.

13. In a milling tool, in combination, a tapered head having a plurality of slots in its outer surface, open at the ends, blades in said slots and each having one end projecting from the corresponding slots, and means positioned at the ends of the slots to engage the ends of the blades and clamp the same to the head.

14. In a milling tool, in combination, a shank having a threaded portion, a head carrying a plurality of detachable cutting blades, and an internally threaded collar having engagement with the threaded portion of the shank and having a portion engaging said head, for detachably securing the head to the shank.

15. In a milling tool, in combination, a head portion, a plurality of cutting blades secured to the side of said head portion and having the backs of the blades supported from end to end by said head portion, and a cutting nose detachably secured to said head.

16. In a milling tool, in combination, a head, a nose portion having cutting edges, detachably secured to said head, and a plurality of cutting blades detachably secured to the head in rear of the nose, the cutting edges of the blades forming continuations of the cutting edges of the nose.

17. In a milling tool, in combination, a head, a nose portion having cutting edges, detachably secured to the head, and a plurality of cutting blades in rear of the nose portion and held in position thereby, said blades being removable from the head when the nose portion has been removed.

18. In a milling tool, in combination, a head having an axial opening therethrough, a cutting nose having a shank extending through said axial opening, and means engaging the rear end of said shank and the head to detachably secure the cutting nose in position on the head.

19. In a milling tool, in combination, a head, a nose portion detachably secured thereto, a clamping ring also detachably secured to the head, in rear of the nose portion, and a plurality of cutting blades clamped between the clamping ring and nose portion and removable from the head whenever either the clamping ring or nose portion is detached from the head.

20. In a cutting tool, in combination, a head portion having a plurality of substantially radial recesses therein, cutting blades fitting in said recesses and clamped securely therein against movement by means associated with the head, which securing means includes means adjustable radially of the head and engaging one end of each blade.

21. In a cutting tool, in combination, a head portion having a plurality of substantially radial recesses therein, cutting blades fitting in said recesses and clamped securely therein against movement by means associated with the head, which securing means includes means encircling the head and adjustable radially relatively thereto and engaging one end of each blade.

22. In a cutting tool, in combination, a head portion having a plurality of substantially radial recesses therein, cutting blades fitting in said recesses and clamped securely therein against movement by means associated with the head, which securing means includes a ring encircling the head and formed in sections so as to be radially adjustable, said ring engaging one end of each blade.

23. In a cutting tool, in combination, a head portion having a plurality of substantially radial recesses therein, cutting blades fitting in said recesses and secured therein by means associated with the head, which securing means includes a ring encircling the head and formed in sections so as to be radially adjustable, said ring having an annular rib engaging the head and surfaces spaced therefrom to engage the ends of the blades.

24. In a cutting tool, in combination, a head portion having a plurality of substantially radial recesses therein, cutting blades fitting in said grooves and secured therein by means associated with the head, which securing means includes a ring encircling the head and formed in sections so as to be radially adjustable, said ring having an annular rib engaging the head, blade engaging surfaces spaced from said rib, and screws intermediate the rib and blade engaging surfaces for securing the rib to the head.

25. In a cutting tool, in combination, a head portion having a plurality of substantially radial grooves, cutting blades extending into said grooves, the ends of said blades being relatively inclined and the longer longitudinal edges of the blades lying in the bottoms of the grooves, and means for clampng said blades in said grooves against movement relatively to the head including a device for engaging one end of each blade.

26. In a cutting tool, in combination, a head portion having a plurality of substantially radial grooves, cutting blades extending into said grooves, the ends of said blades being relatively inclined and the longer longitudinal edges of the blades lying in the bottoms of the grooves, and clamping means cooperating with the ends of the blades for securing the blades to the head against movement relatively to the head.

27. In a milling tool, in combination, a head, a cutting nose detachably secured to the head and having recesses therein, and cutting blades extending into aligned apertures in the head and nose to prevent relative rotation thereof.

28. In a milling tool, in combination, a head having radial grooves therein, a cutting nose detachably secured to the head and having radial grooves in the face adjacent the head and in register with the radial grooves of the head, and cutting blades extending into the aligned grooves of the head and nose to prevent relative rotation thereof.

29. In a cutting tool, in combination, a head portion having a plurality of substantially radial grooves, cutting blades extending into said grooves at least one end edge of each blade making an acute angle with its inner edge and the inner edge of each blade lying in the bottom of the corresponding groove, and securing means for clamping the blades in said grooves against movement relatively to the head, including means for engaging one end of each blade.

30. In a cutting tool, in combination, a head portion having a plurality of slots extending longitudinally and inclined with respect to the axis thereof, blades fitting the bottoms of the slots and having ends which converge toward the cutting edges, and members fitting the ends of the blades and secured to the head portion for holding the blades in place.

31. In a cutting tool, in combination, a head portion having a plurality of slots extending longitudinally and inclined with respect to the axis thereof, blades fitting the bottoms of the slots and having ends which converge toward the cutting edges thereof, and members having surfaces to fit the converging blade ends, at least one of said members being adjustable with respect to the head portion to securely clamp the blades in place.

32. In a cutting tool, in combination, a head portion having a plurality of slots extending longitudinally and inclined with respect to the axis thereof, blades fitting the bottoms of the slots and having ends which converge toward the cutting edges, a member having a surface to fit the blades at one end thereof, and a member adjustable axially of the head portion and having a surface for fitting the blades at the other end thereof.

33. In a cutting tool, in combination, a head portion having a plurality of slots extending longitudinally thereof, blades in the slots having ends which converge toward the cutting edges, a member carried by the head portion and adapted to fit the blades at one end thereof, and a member adjustable radially with respect to the head portion and having a surface which fits the blades at the other end thereof, whereby the blades may be securely clamped in place.

34. In a cutting tool, in combination, a head portion having a plurality of slots extending longitudinally thereof, blades in the slots having ends which converge toward the cutting edges, a member carried by the head portion and adjustable axially thereof for fitting against the blades at one end thereof, and a member carried by the head portion and adjustable radially with respect thereto and having a surface which fits against the blades at the other end thereof.

In testimony whereof I affix my signature.

REES C. MORGAN.